United States Patent
Inoue

(10) Patent No.: US 7,733,403 B2
(45) Date of Patent: Jun. 8, 2010

(54) METHOD OF DRIVING CCD TYPE SOLID-STATE IMAGING DEVICE AND SOLID-STATE IMAGING APPARATUS

(75) Inventor: Tomoki Inoue, Asaki (JP)

(73) Assignee: FUJIFILM CORPORATION, Tokyo (JP)

( * ) Notice: Subject to any disclaimer, the term of this patent is extended or adjusted under 35 U.S.C. 154(b) by 384 days.

(21) Appl. No.: 11/806,769

(22) Filed: Jun. 4, 2007

(65) Prior Publication Data

US 2007/0285546 A1 Dec. 13, 2007

(30) Foreign Application Priority Data

Jun. 5, 2006 (JP) .......................... P2006-155957

(51) Int. Cl.
*H04N 5/335* (2006.01)

(52) U.S. Cl. .................. 348/311; 348/294; 348/312

(58) Field of Classification Search ......... 348/294–324; 250/208.1–208.3; 257/297, 314–323
See application file for complete search history.

(56) References Cited

U.S. PATENT DOCUMENTS 6,278,142 B1 *  8/2001  Hynecek .................... 257/247
6,444,968 B1 *  9/2002  Burt et al. ................. 250/208.1
7,038,723 B1 *  5/2006  Kuroda et al. ............... 348/312
7,573,499 B2 *  8/2009  Doguchi et al. .............. 348/65
2003/0035057 A1 *  2/2003  Hakamata et al. ........... 348/311
2004/0145665 A1 *  7/2004  Oda et al. .................... 348/257

FOREIGN PATENT DOCUMENTS

JP  2609363 B2  1/1992
JP  3483261 B2  7/1995

* cited by examiner

*Primary Examiner*—Tuan Ho
*Assistant Examiner*—Don Nguyen
(74) *Attorney, Agent, or Firm*—Birch, Stewart, Kolasch & Birch, LLP

(57) ABSTRACT

A driving section 4 supplies a reading pulse of 'H' to electrodes V1 and V5 simultaneously with completion of exposure to read out electric charges to empty packets below electrodes V1, V2, V5, and V6. Then, the driving section 4 supplies a driving pulse of 'M' to electrodes V3 and V7 and a multiplication pulse to the electrodes V2 and V6. At this time, a level of the multiplication pulse supplied to the electrodes V2 and V6 is set so that a potential difference between the electrodes V1 and V3 and the electrode V2 and a potential difference between the electrodes V5 and V7 and the electrode V6 become values required to cause avalanche multiplication. Electric charges accumulated below the electrodes V1 to V3 move into packets formed below the electrodes V2 and V6. The avalanche multiplication occurs at the time of movement. Thus, the electric charges are multiplied.

16 Claims, 11 Drawing Sheets

METHOD OF DRIVING CCD TYPE SOLID-STATE IMAGING DEVICE AND SOLID-STATE IMAGING APPARATUS

BACKGROUND OF THE INVENTION

1. Technical Field

The invention relates to a method of driving a CCD type solid-state imaging device having a plurality of photoelectric conversion elements, which are arranged on a semiconductor substrate in a row direction and a column direction perpendicular to the row direction, and a charge transfer device that reads out electric charges generated in the plurality of photoelectric conversion elements and that transfers the read electric charges in the column direction, which is a charge transfer direction.

2. Description of the Related Art

Japanese Patent Nos. 2609363 and 3483261 disclose a technique for improving the sensitivity of a CCD type solid-state imaging device by multiplying electric charges at the time of charge transfer through avalanche multiplication in a charge transfer channel.

FIG. 11 is partially sectional views schematically illustrating a charge transfer device disclosed in Japanese Patent No. 2609363.

As shown in FIG. 11, a charge transfer device is configured to include a charge transfer channel 200 formed in a silicon substrate, an insulating layer 201 formed on the charge transfer channel 200, and a plurality of electrodes 202 to 205 formed on the insulating layer 201. As shown in FIG. 11(a), a driving pulse on which a reading pulse is superimposed is supplied to the electrode 203 so that a potential well (hereinafter, referred to as "packet") P1 is formed in the charge transfer channel 200 and below the electrode 203 and that electric charges generated in a photoelectric conversion element (not shown) are read out to the packet P1. Then, as shown in FIG. 11(b), a pulse having a predetermined level is supplied to the electrode 204 to form a packet P2 in the charge transfer channel 200 and below the electrode 204. At this time, levels of the pulses supplied to the electrodes 203 and 204 is set so that a potential difference between the packet P1 and the packet P2 becomes a value required to cause the avalanche multiplication.

A difference between depths of the packets P1 and P2 occurs due to a level difference between the pulses supplied to the electrodes 203 and 204. The depth of the packet P2 is larger than that of the packet P1. Accordingly, electric charges existing in the packet P1 move to the packet P2. In this case, since the electric charges move through a high electric field region d generated between the electrodes 203 and 204, the avalanche effect occurs in the high electric field region so that the electric charges are multiplied. After multiplying the electric charges, a level of a pulse supplied to the electrode 204 is changed to a level that causes the packet P2 to be a barrier against the packet P1. Thus, the packet P2 returns to its original state as shown in FIG. 11(c). Then, the electric charges existing in the packet P1 are transferred in the charge transfer direction by supplying transfer pulses to the plurality of electrodes 202 to 205.

In the method of driving a charge transfer device described above, the following problem arises because there is a potential difference between barrier potentials at both ends of the packet P2 for causing the avalanche multiplication as shown in FIG. 11. In the case when the packet P2 is formed as shown in FIG. 11(b), even unnecessary charges (referred to as "unnecessary charges A"), such as noises generated on a surface of the charge transfer channel 200 below the electrode 205, move to the packet P2 together with the electric charges existing in the packet P1. In addition, the unnecessary charges A are also multiplied in the high electric field region between the electrodes 204 and 205. On the other hand, unnecessary charges (referred to as "unnecessary charges B") exist even in the packet P1. Accordingly, the unnecessary charges B are also multiplied in the same manner as described above. Moreover, a region d2 between the electrodes 204 and 205 is larger in electric field than a region d1 between the electrodes 203 and 204. Therefore, the unnecessary charges A are larger in number than the unnecessary charges B. Also, the large electric field causes breakdown of free electrons in the region d2. Accordingly, a multiplication factor of the unnecessary charges A is larger than that of the unnecessary charges B. As a result, S/N is deteriorated.

SUMMARY OF THE INVENTION

The invention has been made in view of the above circumstances, and provides a method of driving a CCD type solid-state imaging device, that can improve the sensitivity while preventing S/N from being deteriorated.

According to an aspect of the invention, a CCD type solid-state imaging device includes a plurality of photoelectric conversion elements and a charge transfer device. The photoelectric conversion elements are arranged on a semiconductor substrate in a row direction and a column direction perpendicular to the row direction. The charge transfer device reads out electric charges generated in the plurality of photoelectric conversion elements, and transfers the read electric charges in the column direction, which is a charge transfer direction. The charge transfer device includes a charge transfer channel and a plurality of electrodes. The charge transfer channel is formed in the semiconductor substrate. The plurality of electrodes are formed above the charge transfer channel. A method of driving the CCD type solid-state imaging device includes: reading out the electric charges from at least a part of the plurality of photoelectric conversion elements to the charge transfer channel; and multiplying the electric charges by moving the electric charges in a charge accumulation packet corresponding to middle one of three electrodes, which are arranged in the column direction and which respectively correspond to charge accumulation packets, to a multiplication packet formed below the middle one of the corresponding three electrodes by a multiplication pulse. The multiplication packet corresponds to at least the three electrodes. The multiplication packet is formed by supplying driving pulses having a predetermined level to both end ones of the three electrodes and supplying, to the middle ones of the three electrodes, the multiplication pulse that causes avalanche multiplication with respect to the predetermined level.

Also, the multiplying may include: supplying the driving pulses having the predetermined level to the three electrodes to form the charge accumulation packets corresponding to the three electrodes below the three electrodes, and supplying the multiplication pulse to the middle one of the three electrodes in a state where the charge accumulation packets have been formed, to form the multiplication packet.

Also, the multiplying may include setting any one of the electrodes, which are located above the charge transfer channel between the two charge accumulation packets adjacent to each other in the column direction, except side electrodes in one of the two charge accumulation packets as the middle electrode, and moving electric charges in the other charge accumulation packet to the multiplication packet formed below the middle electrode by the multiplication pulse to multiply the electric charges.

Also, the multiplying may be repeated plural times when the charge accumulation packets are located at predetermined positions.

Also, the multiplying may be performed whenever the charge accumulation packets are transferred a predetermined amount.

Also, number of times the multiplying is repeated may be changed depending on a photographing condition.

Also, the method may further include: switching between (i) multiplication transfer driving in which the multiplying is performed and (ii) normal transfer driving in which the multiplying is not performed, according to a photographing condition; and when the multiplication transfer driving is performed, making control so that a saturated charge amount of each of the plurality of photoelectric conversion elements at a time of imaging is smaller than a saturated charge amount of each of the plurality of photoelectric conversion elements at a time of imaging in a case of performing the normal transfer driving.

Also, in the case of performing the multiplication transfer driving, the number of times the multiplying is performed may be set so that a multiplication factor of the electric charges does not exceed Q2/Q1 where Q1 denotes the saturated charge amount of each of the plurality of photoelectric conversion elements at the time of imaging in the case of performing the multiplication transfer driving, and Q2 denotes the saturated charge amount of each of the plurality of photoelectric conversion elements at the time of imaging in the case of performing the normal transfer driving.

Also, a voltage of the multiplication pulse may be equal to a voltage of a reading pulse used in the reading out of the electric charges generated in each of the plurality of photoelectric conversion elements to the charge transfer channel.

Also, a voltage of the multiplication pulse may be higher than a voltage of a reading pulse used in the reading out of the electric charges generated in each of the plurality of photoelectric conversion elements to the charge transfer channel.

According to another aspect of the invention, a solid-state imaging apparatus includes a CCD type solid-state imaging device and a driving section. The CCD type solid-state imaging device includes a plurality of photoelectric conversion elements and a charge transfer device. The plurality of photoelectric conversion elements are arranged on a semiconductor substrate in a row direction and a column direction perpendicular to the row direction. The charge transfer device reads out electric charges generated in the plurality of photoelectric conversion elements, and transfers the read electric charges in the column direction, which is a charge transfer direction. The driving section outputs to the CCD type solid-state imaging device a pulse for driving the CCD type solid-state imaging device based on the driving method set forth above.

Also, the solid-state imaging apparatus may further include a correction section that corrects variation, which is caused by a multiplication factor of the electric charges, of signals corresponding to the electric charges acquired from the plurality of photoelectric conversion elements when the multiplying is performed.

Also, the plurality of photoelectric conversion elements may contain a plurality of black-level-detection photoelectric conversion elements for detecting a black level. The solid-state imaging apparatus may further include a black level variation correction section and a black level correction section. The black level variation correction section corrects variation, which is caused by a multiplication factor of electric charges, of a dark output signal corresponding to the electric charges acquired from each of the plurality of black-level-detection photoelectric conversion elements when the multiplying is performed. The black level correction section corrects black levels of signals acquired from the plurality of photoelectric conversion elements except the black-level-detection photoelectric conversion elements, using the dark output signal corrected by the black level variation correction unit.

According to the above configuration, it is possible to provide a method of driving a CCD type solid-state imaging device capable of improving the sensitivity while preventing S/N from being deteriorated.

DETAILED DESCRIPTION OF EMBODIMENTS OF THE INVENTION

Hereinafter, embodiments of the invention will be described with reference to the accompanying drawings.

First Embodiment

Figure 1:
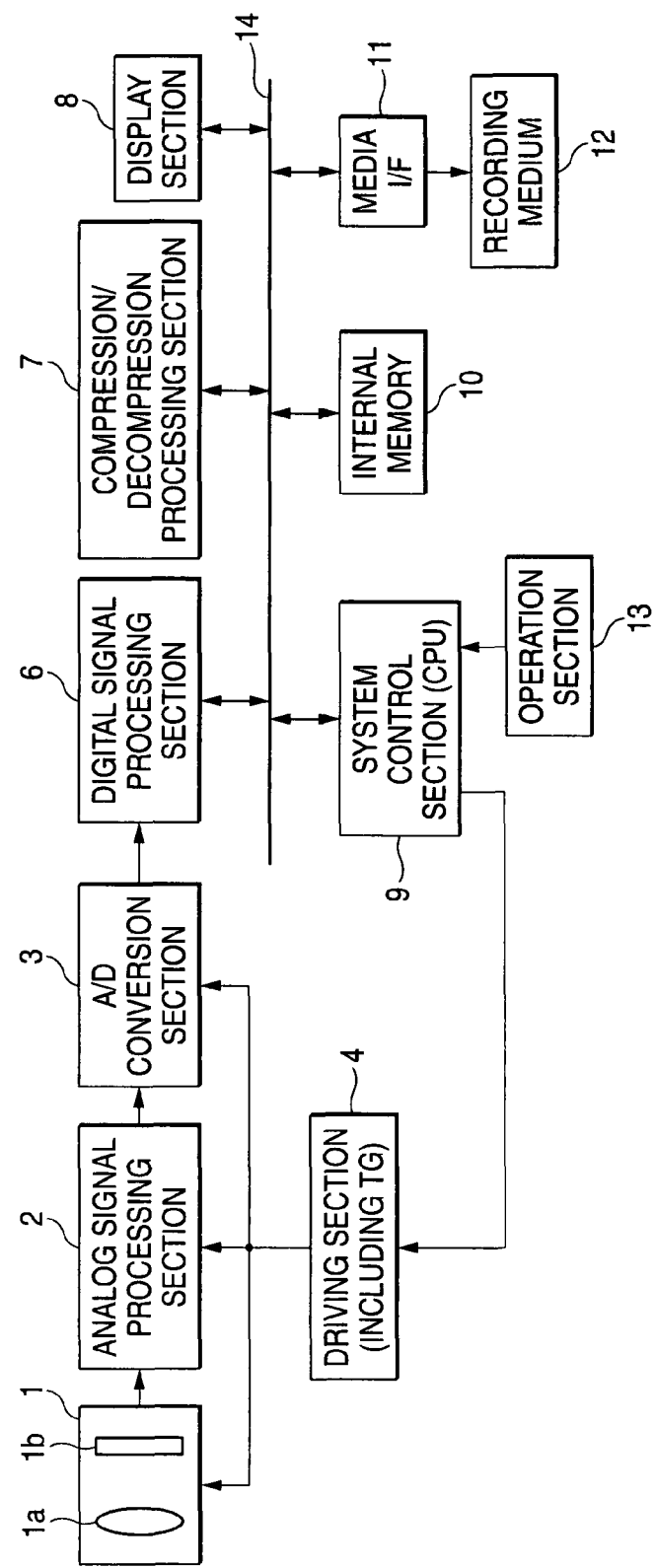
FIG. 1 is a block diagram schematically illustrating the configuration of a digital camera which is an example of a solid-state imaging apparatus according to a first embodiment of the invention.

FIG. 1 is a block diagram schematically illustrating the configuration of a digital camera that is an example of a solid-state imaging apparatus according to a first embodiment.

A digital camera shown in FIG. 1 includes an imaging section 1, an analog signal processing section 2, an A/D conversion section 3, a driving section 4, a digital signal processing section 6, a compression/decompression processing section 7, a display section 8, a system control section 9, an internal memory 10, a media interface (I/F) 11, a recording medium 12, and an operation section 13. The digital signal processing section 6, the compression/decompression processing section 7, the display section 8, the system control section 9, the internal memory 10, and the media interface 11 are connected to a system bus 14.

The imaging section 1 images a photographic subject using an optical system including an imaging lens 1a and a CCD type solid-state imaging device 1b, and outputs an analog imaging signal. The analog signal processing section 2 performs a predetermined analog signal process for the imaging signal acquired by the imaging section 1. The A/D conversion section 3 converts an analog signal, which is obtained by the process performed in the analog signal processing section 2, into a digital signal.

In the case when the digital camera is set to an imaging mode (mode in which it is possible to image a photographic subject and to record photographed image data), the driving section 4 supplies predetermined pulses to the solid-state imaging device 1b, the analog signal processing section 2, and the A/D conversion section 3 using driving pulses supplied from the system control section 9, to thereby drive the solid-state imaging device 1b, the analog signal processing section 2, and the A/D conversion section 3. The photographing mode includes a still image photographing mode in which still image data can be recorded and a motion picture photographing mode in which dynamic image data can be recorded.

The digital signal processing section 6 generates photographed image data by performing a digital signal process, which corresponds to an operation mode set by the operation section 13, for the digital signal from the A/D conversion section 3. The digital signal processing section 6 performs a multiplication factor correction process, a black level correction process (an OB process), a linear matrix correction process, a white balance adjustment process, a gamma control process, a synchronization process, a Y/C transform process, and the like. The digital signal processing section 6 is implemented by a DSP, for example.

The compression/decompression processing section 7 performs a compression process for the photographed image data generated by the digital signal processing section 6 and a decompression process for compressed image data obtained from the recording medium 12.

The display section 8 is configured to include, for example, an LCD display device, and displays an image based on the photographed image data that has been subjected to the digital signal process after photographing. In addition, the display section 8 also displays an image based on image data obtained by decompressing the compressed image data recorded in the recording medium 12. Moreover, through images during the photographing mode, information related to various kinds of states and operations of a digital camera, and the like may be displayed.

The system control section 9 includes a processor operating by a predetermined program as a main component, and makes an overall control of the digital camera including the photographing operation.

The internal memory 10 is a DRAM, for example. The internal memory 10 is used as a work memory of the digital signal processing section 6 or the system control section 9 and also used as a buffer memory for temporarily storing the photographed image data recorded in the recording medium 12 or a buffer memory for image data to be displayed on the display section 8. The media interface 11 is used to input/output data to/from the recording medium 12 such as a memory card.

The operation section 13 performs various kinds of operations while using the digital camera, and includes a release button (not shown) for making a photographing instruction.

Figure 2:
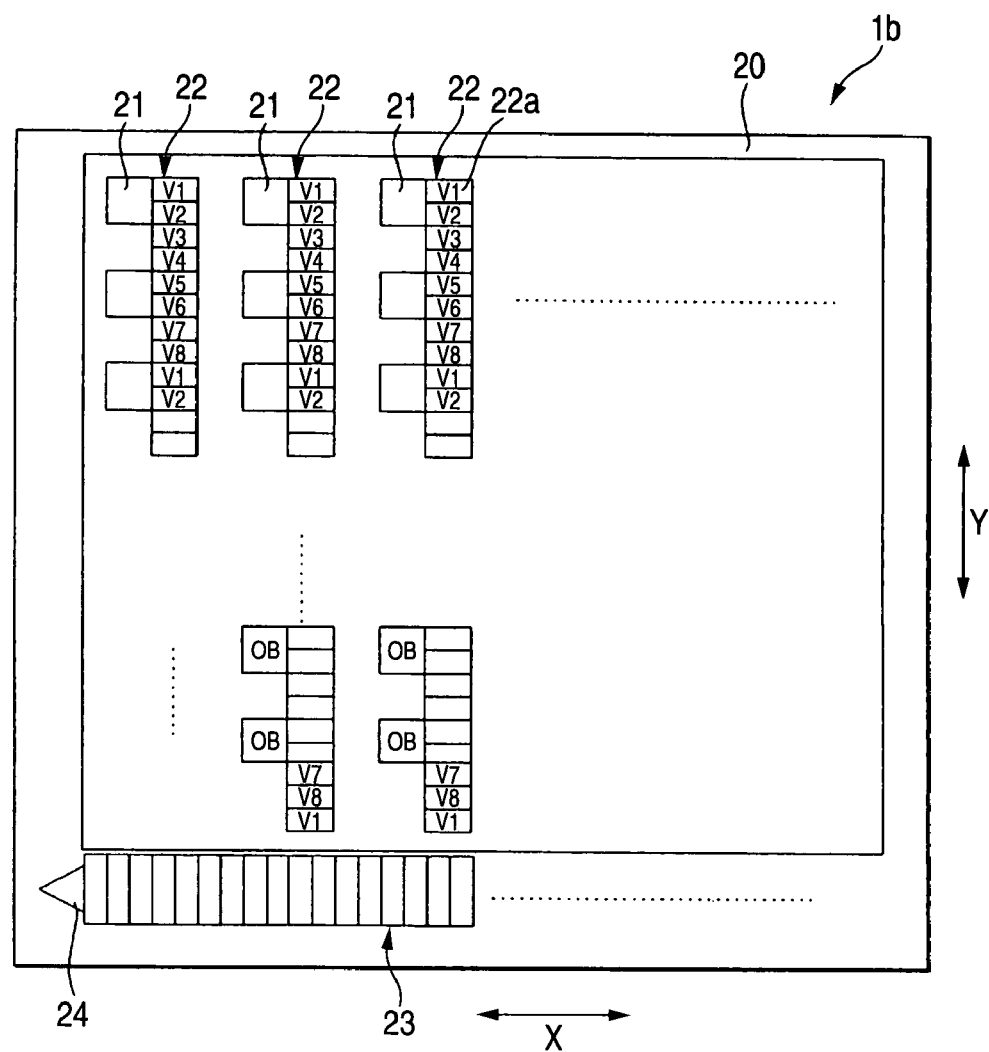
FIG. 2 is a plan view schematically illustrating the configuration of a solid-state imaging device shown in FIG. 1.

FIG. 2 is a plan view schematically illustrating the configuration of the solid-state imaging device 1b shown in FIG. 1.

The solid-state imaging device 1b includes a large number of photoelectric conversion elements 21, a vertical charge transfer device 22, a horizontal charge transfer device 23 and an output section 24. The photoelectric conversion elements 21 are arranged in a row direction (X direction in the drawing) and a column direction (Y direction in the drawing) on an n-type semiconductor substrate 20. The vertical charge transfer device 22 transfers electric charges read from each of the plurality of photoelectric conversion elements 21 in the column direction. The horizontal charge transfer device 23 transfers the electric charges transferred from the vertical charge transfer device 22 in the column direction. The output section 24 outputs signals corresponding to the electric charges transferred from the horizontal charge transfer device 23. In addition, the photoelectric conversion elements 21 that are shielded from light are formed in a lower part of the semiconductor substrate 20 in order to detect a black level and are attached with a character "OB."

In addition, in this specification, movement of the electric charges transferred by the vertical charge transfer device 22 is considered as one flow. Relative position of each member may be specified as "upstream of something," "downstream of something," and the like as needed.

The vertical charge transfer device 22 is configured to include a vertical charge transfer channel (not shown) and a large number of electrodes 22a. The vertical charge transfer channel is formed corresponding to photoelectric conversion element rows including the plurality of photoelectric conversion elements 21 arranged in the column direction. The large number of electrodes 22a are formed above the vertical charge transfer channel with a gate insulating layer interposed therebetween. The large number of electrodes 22a includes eight kinds of electrodes to which driving pulses V1 to V8 are respectively supplied. In FIG. 1, on the electrodes to which the respective driving pulses V1 to V8 are supplied, the corresponding characters V1 to V8 are attached. Hereinafter, the electrodes 22a, to which the driving pulses V1 to V8 are supplied, may be referred to as electrodes V1 to V8, respectively. The electrodes V1 to V8 are arranged in the column direction in this order. The large number of electrodes 22a are arranged so that eight electrodes of the electrodes V1 to V8 are repeatedly arranged in the column direction. In this case, the electrode 22a located at the position closest to the horizontal charge transfer device 23 is the electrode V1.

In the vertical charge transfer device 22, each charge transfer stage is formed of one electrode 22a and a region of the vertical charge transfer channel formed therebelow. In the example shown in FIG. 2, eight charge transfer stages are formed of the electrodes V1 to V8, and four charge transfer stages are provided corresponding to each of the plurality of photoelectric conversion elements 21.

A charge read region (not shown) is formed between the vertical charge transfer channel below the electrodes V1 and V5 and the photoelectric conversion elements 21. By supplying a high-voltage reading pulse to the electrodes V1 and V5, electric charges that are generated and accumulated in the photoelectric conversion elements 21 are read out to the vertical charge transfer channel through the charge read region. The electric charges read out to the vertical charge transfer channel are transferred in the column direction which is the charge transfer direction, and are then transferred up to the horizontal charge transfer device 23.

By supplying driving pulses φV1 to φV8 from the driving section 4 to the respective electrodes V1 to V8, the vertical charge transfer device 22 is driven in eight phases. Each of the driving pulses φV1 to φV8 may have three states including 'L' (low level; for example, −8 V), 'M' (middle level; for example, 0 V) corresponding to a voltage higher than 'L', and 'H' (high level; for example, 16 V) corresponding to a voltage higher than 'M.' A high-level pulse corresponds to a reading pulse. Moreover, a multiplication pulse, which has the same level as a reading pulse or a level higher than the reading pulse, can be supplied to the electrode V2 and the electrode V6.

The CCD type solid-state imaging device 1b has a vertical overflow drain structure. Accordingly, it is possible to adjust the saturated charge amount, which is a maximum value of electric charges that can be accumulated in each of the photoelectric conversion elements 21, by adjusting a voltage applied to the silicon substrate 20. A pulse for adjusting the saturated charge amount is also supplied from the driving section 4 to the solid-state imaging device 1b.

According to a photographing condition such as the photographing sensitivity, the driving section 4 performs either (i) normal transfer driving for transferring electric charges acquired from each of the photoelectric conversion elements 21 without multiplication and then reading out the electric charges as a signal or (ii) multiplication transfer driving for multiplying the electric charges acquired from each of the photoelectric conversion elements 21 and then reading out the electric charges as a signal. In the case when the photograph sensitivity is set to a high sensitivity, for example, ISO400 or more, the driving section 4 performs the multiplication transfer driving because the amount of electric charges accumulated in each of the photoelectric conversion elements 21 decreases. On the other hand, in the case when the photograph sensitivity is set to a low sensitivity that is lower than, for example, ISO400, the driving section 4 performs the normal transfer driving because the amount of electric charges accumulated in each of the photoelectric conversion elements 21 increases.

Next, the multiplication transfer driving performed by the driving section 4 will be described. As the multiplication transfer driving, there are first and second driving methods. The first and second driving methods may be selectively performed, or only one of the first and second driving methods may be performed.

(First Driving Method)

Figure 3:
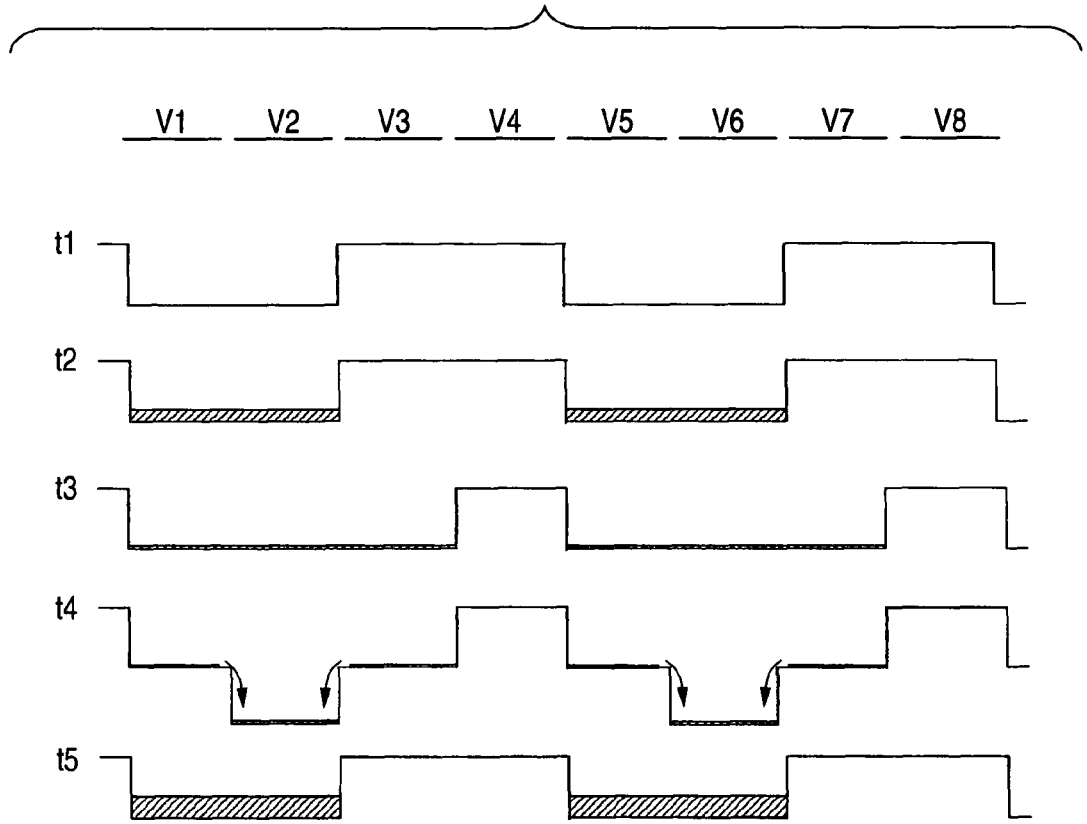
FIG. 3 is a view illustrating a potential flow caused by a first driving method in a vertical charge transfer channel below the respective electrodes shown in FIG. 2 at the time of high-sensitivity photographing.

FIG. 3 is a view illustrating the potential flow in the vertical charge transfer channel below each electrode shown in FIG. 2 at the time of high-sensitivity photographing.

When a release button is pressed to start exposure, the driving section 4 supplies a driving pulse of 'M' to the electrodes V1, V2, V5, and V6 and supplies a driving pulse of 'L' to the electrodes V3, V4, V7, and V8 during the exposure period, to thereby form empty packets below the electrode V1, V2, V5, and V6 (time t1 in FIG. 3).

The driving section 4 supplies a reading pulse of 'H' to the electrodes V1 and V5 simultaneously with completion of the exposure. Accordingly, electric charges accumulated in the photoelectric conversion elements 21 are read out to the empty packets below the electrodes V1, V2, V5, and V6 through the charge read region (time t2 in FIG. 3). The packets in which electric charges are accumulated at this point of time may be referred to as "charge accumulation packets." The capacitance of the charge accumulation packet is the maximum amount of electric charges that can be transferred by the charge transfer device 22 and is equivalent to a transfer capacitance.

Then, the driving section 4 supplies a driving pulse of 'M' to the electrodes V3 and V7 to form empty packets below the electrodes V3 and V7 so that the charge accumulation packets are widened horizontally by one packet (time t3 in FIG. 3).

Then, the driving section 4 supplies a multiplication pulse to the electrodes V2 and V6. At this time, the level of the multiplication pulse supplied to the electrodes V2 and V6 is set so that a potential difference between (i) the electrodes V1 and V3 and (ii) the electrode V2 and a potential difference between (i) the electrodes V5 and V7 and (ii) the electrode V6 become values required to cause the avalanche multiplication. Thus, packets formed below the electrodes V2 and V6 are deeper than packets formed below the both electrodes adjacent to each of the electrodes V2 and V6. Accordingly, electric charges accumulated in the charge accumulation packets move into the packets formed below the electrodes V2 and V6. At the time of this movement, the avalanche multiplication occurs, so that the electric charges are multiplied (time t4 in FIG. 3).

Then, the driving section 4 supplies a driving pulse of 'M' to the electrodes V2 and V6 to return a state of each of the charge accumulation packets to the state at time t3. Thereafter, the driving section 4 supplies a driving pulse of 'L' to the electrodes V3 and V7 to return a state of each of the charge accumulation packets to the state at time t2 (time t5 in FIG. 3). Then, the driving section 4 supplies a predetermined driving pulse to the electrodes V1 to V8 to transfer the charge accumulation packets by one stage. That is, the charge accumulation packets located below the electrodes V1 and V2 at time t5 are transferred below the electrodes V5 and V6 neighboring the downstream side of the electrodes V1 and V2. When the charge accumulation packets are transferred by one stage, electric charges corresponding to one stage are transferred to the horizontal charge transfer device 23. Thus, the transfer in the row direction starts. Then, after the transfer of the electric charges corresponding to one stage in the row direction is completed, the driving section 4 supplies a predetermined driving pulse to the electrodes V1 to V8 to transfer the charge accumulation packets by one stage. Such operations are repeated until the electric charges corresponding to all the lines are transferred to the horizontal charge transfer device 23. In addition, in the case of the normal transfer driving, a predetermined driving pulse may be supplied to the electrodes V1 to V8 after reading out electric charges at time t2 so that the charge accumulation packets are sequentially transferred, without performing the driving from time t3 to time t5.

Thus, in the first driving method, the electric charges in charge accumulation packets are multiplied by moving the electric charges accumulated in the charge accumulation packets to packets formed below the electrodes V2 and V6 under a state where a driving pulse of 'M' is supplied to each of the electrodes V1, V3, V5, and V7 neighboring the electrodes V2 and V6 and a multiplication pulse is supplied to the electrodes V2 and V6, as shown at time t4 in FIG. 3. As shown at time t4 in FIG. 3, the depths of packets below the electrodes V1, V3, V5, and V7 are equal to each other. For this reason, noise charges existing on a surface of the charge transfer channel below the electrodes V1, V3, V5, and V7 are multiplied at the same multiplication factor at the both ends of the packets below the electrodes V2 and V6. Therefore, the rate of noise charges included in the electric charges in the charge accumulation packets can be reduced as compared with that in the related art, and thus the S/N is improved.

Moreover, in the first driving method, only driving from time t3 to time t5 shown in FIG. 3 is added to the normal transfer driving in which the charge multiplication is not performed. Accordingly, the multiplication of electric charges can be realized with simple driving.

In addition, the driving section 4 may repeatedly perform the driving from time t3 to time t5 in FIG. 3 plural times before transferring the charge accumulation packets.

Thereby, since the electric charges can be multiplied plural times, it is possible to increase the multiplication factor. In the digital camera shown in FIG. 1, it may be possible to operate the operation section 13 to set the photographing ISO sensitivity or to automatically set the photographing ISO sensitivity according to the brightness. The system control section 9 notifies the driving section 4 of the set photographing ISO sensitivity. The multiplication factor of electric charges changes depending on the photographing ISO sensitivity. Accordingly, the driving section 4 may adjust the multiplication factor by changing the number of times the electric charges are multiplied, that is, the number of times the driving from time t3 to time t5 in FIG. 3 are repeated, according to a photographing condition such as instructed photographing ISO sensitivity, so as to adjust the multiplication factor.

In addition, the driving section 4 may perform the driving from time t3 to time t5 shown in FIG. 3 whenever the charge accumulation packets are transferred a predetermined amount. For example, the driving section 4 performs the driving from time t3 to time t5 shown in FIG. 3 once or plural times whenever the charge accumulation packets are transferred plural stages. In this manner, since the process for multiplying the electric charges accumulated in the predetermined charge accumulation packet can be performed in various positions on the vertical transfer channel, it becomes possible to reduce fixed-pattern noises resulting from a structure difference among respective positions of the solid-state imaging device 1b.

Usually, the saturated charge amount of each photoelectric conversion element 21 is set to be equal to the transfer capacitance of the charge transfer device 22. Therefore, if a high-brightness portion exists on a photographic subject at the time of imaging and the electric charges whose amount is close to the saturated charge amount are read from the photoelectric conversion elements 21, which detect light from the high-brightness portion, to the vertical transfer channel, the electric charges approximately equal to the transfer capacitance are already accumulated in a packet. In this state, if the driving section 4 performs the driving from time t3 to time t5 shown in FIG. 3 plural times to multiply the electric charges plural times, the multiplied charges exceed the transfer capacitance. As a result, the excessive charges overflow into other charge accumulation packets. In the case where the multiplication is performed only once and the multiplying voltage is not so high, the amount of overflowing charges is negligible. However, in the case where the multiplication is performed plural times, the amount of overflowing charges is also large, which causes smear or blooming.

In order to perform the driving from time t3 to time t5 in FIG. 3 plural times, the driving section 4 may control a voltage supplied to the semiconductor substrate 20 so that the saturated charge amount of each of the plurality of photoelectric conversion elements 21 at the time of imaging in the case of performing the multiplication transfer driving is smaller than that in the case of performing the normal transfer driving. In this manner, even if the high-brightness portion is included in the photographic subject at the time of high-sensitivity photographing, the maximum amount of the electric charges read out to the vertical transfer channel can be made sufficiently smaller than the transfer capacitance of the vertical charge transfer device 22. Accordingly, even if the electric charges are multiplied plural times, it is possible to prevent the electric charges from overflowing. As a result, it is possible to prevent the smear.

In addition, even if the saturated charge amount of the photoelectric conversion elements 21 is small at the time of high-sensitivity photographing, the multiplied charges exceed the transfer capacitance when the multiplication factor of electric charges is too large. Therefore, in the case of imaging with the multiplication transfer driving being performed in a state where the saturated charge amount of the photoelectric conversion elements 21 is set to be small, the driving section 4 may set the number of time the electric charges are multiplied so that the multiplication factor of the electric charges does not exceed $Q2/Q1$ where Q1 denotes the saturated charge amount of each of the plurality of photoelectric conversion elements 21 at the time of imaging in the case of performing the multiplication transfer driving and Q2 denotes the saturated charge amount of each of the plurality of photoelectric conversion elements 21 at the time of imaging in the case of performing the normal transfer driving.

For example, it is assumed that the saturated charge amount of each of the plurality of photoelectric conversion elements 21 at the time of imaging in the case of performing the multiplication transfer driving is 10 and the saturated charge amount of each of the plurality of photoelectric conversion elements 21 at the time of imaging in the case of performing the normal transfer driving is 100. It can be seen that there is no problem even if the multiplication factor is set up to 10 (=100/10). Therefore, the driving section 4 stores information indicating a relation between respective numbers of times the multiplication is performed and the resultant multiplication factors in memory, and may determine the number of times the driving from time t3 to time t5 in FIG. 3 is performed, according to the information stored in the memory and a photographing condition.

(Second Driving Method)

Figure 4:
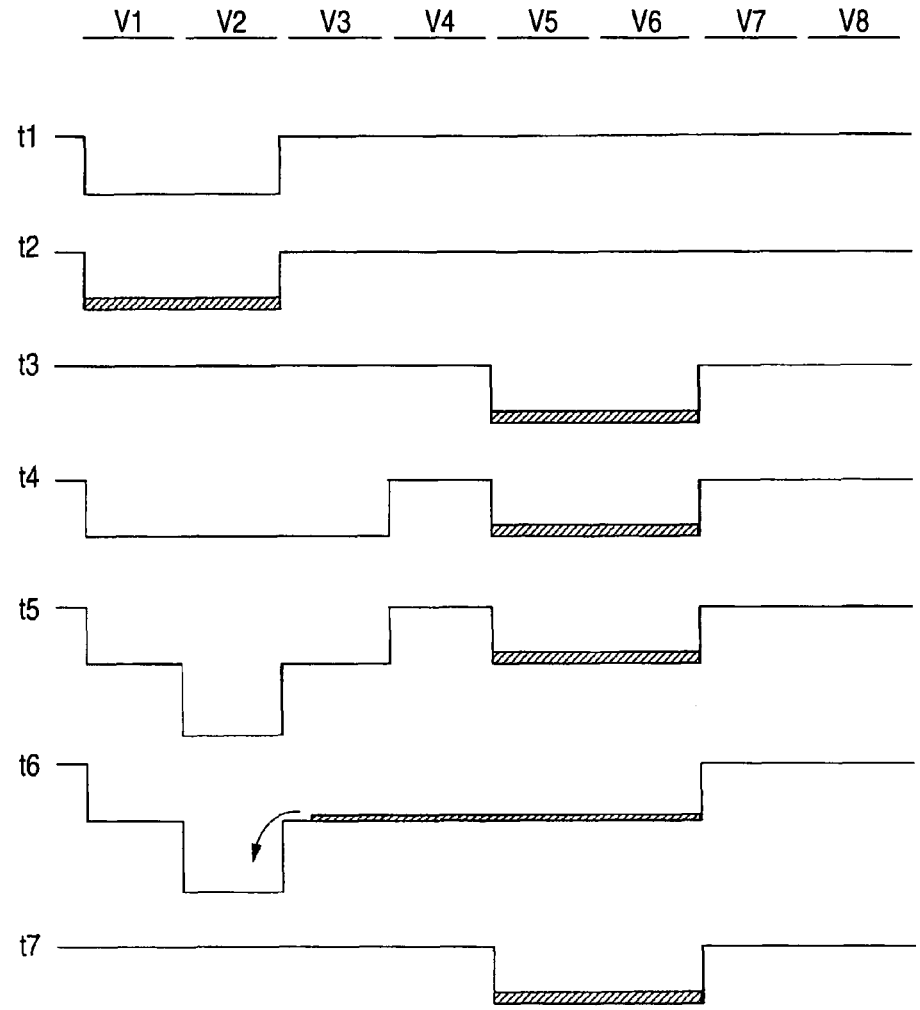
FIG. 4 is a view illustrating a potential flow caused by a second driving method in the vertical charge transfer channel below the respective electrodes shown in FIG. 2 at the time of the high-sensitivity photographing.

FIG. 4 is a view illustrating the potential flow of the vertical charge transfer channel below each electrode shown in FIG. 2 at the time of high-sensitivity photographing. The second driving method performs interlaced driving for reading out the electric charges from odd-row photoelectric conversion elements 21 and even-row photoelectric conversion elements 21 separately. FIG. 4 illustrates only the potential flow at the time of reading out the electric charges from the odd-row photoelectric conversion elements 21.

When the release button is pressed to start the exposure, the driving section 4 supplies a driving pulse of 'M' to the electrodes V1 and V2 and supplies a driving pulse of 'L' to the electrodes V3 to V8 during the exposure period, to thereby form empty packets below the electrode V1 and V2 (time t1 in FIG. 4).

The driving section 4 supplies a reading pulse of 'H' to the electrode V1 simultaneously with completion of the exposure. Accordingly, electric charges accumulated in the photoelectric conversion elements 21 are read out to the empty packets below the electrodes V1 and V2 through the charge read region (time t2 in FIG. 4). The packet in which electric charges are accumulated at this time is referred to as a "charge accumulation packet." The capacitance of the charge accumulation packet is the maximum amount of charges that can be transferred by the charge transfer device 22 and is equivalent to the transfer capacitance.

Then, the driving section 4 supplies a predetermined driving pulse to the electrodes V1 to V8 to transfer the charge accumulation packet by one stage. That is, the charge accumulation packets located below the electrodes V1 and V2 at the time t2 are transferred below the electrodes V5 and V6 neighboring the downstream side of the electrodes V1 and V2 (time t3 in FIG. 4).

Then, the driving section 4 supplies a driving pulse of 'M' to the electrodes V1, V2, and V3 to form empty packets below the electrodes V1, V2, and V3 (time t4 in FIG. 4) and then, supplies a multiplication pulse to the electrode V2 (time t5 in FIG. 4). At this time, the level of the multiplication pulse supplied to the electrode V2 is set so that a potential difference between (i) the electrodes V1 and V3 and (ii) the electrode V2 becomes a value required to cause the avalanche multiplication.

Then, the driving section 4 supplies a driving pulse of 'M' to the electrode V4 to remove a barrier between the charge accumulation packets and the empty packets formed below the electrodes V1, V2, and V3 (time t6 in FIG. 4). Accordingly, the electric charges in the charge accumulation packet move into the packet formed below the electrode V2. As a result, the avalanche multiplication occurs so that the electric charges are multiplied.

Then, the driving section 4 supplies a driving pulse of 'L' to the electrodes V1, V2, and V3 to return a state of the charge accumulation packet to the state at time t3 in FIG. 4 (time t7 in FIG. 4). Thereafter, the driving section 4 supplies a predetermined driving pulse to the electrodes V1 to V8 to sequentially transfer the charge accumulation packet. Moreover, in the case of the normal transfer driving, after reading out the electric charges at time t2 in FIG. 4 and transferring charge accumulation packets at time t3 in FIG. 4 by one stage, the predetermined driving pulse may be supplied to the electrodes V1 to V8 without performing the driving from time t4 to time t7 so that the charge accumulation packets are sequentially transferred. In addition, in a second field in which the electric charges from even-row photoelectric conversion elements are read out, empty packets are formed below the electrodes V5 and V6 and electric charges are read out to the empty packets to obtain the state shown at time t3 of FIG. 4. Then, the driving from time t4 to time t7 in FIG. 4 is performed to multiply the electric charges, and then the predetermined driving pulse is supplied to the electrodes V1 to V8 to sequentially transfer the charge accumulation packets.

Thus, in the second driving method, the electric charges in the charge accumulation packet are multiplied by moving the electric charges accumulated in the charge accumulation packet to the packet formed below the electrode V2 under a state where the driving pulse of 'M' is supplied to each of the electrodes V1 and V3 neighboring the electrode V2 and the multiplication pulse is supplied to the electrode V2, as shown at time t6 in FIG. 4. As shown at time t6 in FIG. 4, the depths of packets below the electrodes V1 and V3 are equal to each other. Therefore, noise charges existing on a surface of the charge transfer channel below the electrodes V1 and V3 are multiplied at the same multiplication factor at both ends of the packet below the electrode V2. Therefore, the rate of noise charges included in the electric charges in the charge accumulation packets can be reduced as compared with that in the related art, and thus the S/N is improved.

In the first driving method, as shown at time t4 in FIG. 3, the electric charges, which originally exist below the electrode V2, among the electric charges within the charge accumulation packet fall to the packet below the electrode V2 simultaneously with the supply of the multiplication pulse. Accordingly, all of the electric charges are not multiplied. In contrast, in the second driving method, all of the electric charges in the charge accumulation packet move through the high electric field region between the electrodes V2 and V3, as shown at time t6 in FIG. 4. Accordingly, all of the electric charges can be multiplied. That is, the multiplication of electric charges can be performed more efficiently in the second driving method than in the first driving method. In the first driving method, the electric charges move from the packets, which neighbor the both ends of each of the packets formed below the electrodes V2 and V6, to the packets formed below the electrodes V2 and V6. Accordingly, as compared with the second driving method in which electric charges are transferred from a single side, the first driving method is advantageous in that time required for multiplication of electric charges can be shortened.

Moreover, in the second driving method, among the electrodes (in this embodiment, the electrodes V1 to V4, V7, and V8 in the state of time t3 in FIG. 4) located above the charge transfer channel between the two charge accumulation packets adjacent to each other in the column direction, any of the electrodes except the two electrodes (in this embodiment, electrodes V7 and V8 in the state of time t3 in FIG. 4) arranged adjacent to the electrode above one of the charge accumulation packets may be used as an electrode to which the multiplication pulse is supplied.

In the case of the configuration in which the multiplication pulse is supplied to the electrode V1, the state of time t3 in FIG. 4 may proceed to the state of time t7 in FIG. 4 by supplying a driving pulse of 'M' to the electrodes V8 and V2 and supplying a multiplication pulse to the electrode V1, then supplying a driving pulse of 'M' to the electrodes V3 and V4 to move the electric charges in the charge accumulation packet to the packet formed below the electrode V1 for multiplication, and then supplying a driving pulse of 'L' to the electrodes V8, V1, V2, V3, and V4. In this case, the electrode V1 also serves as a read electrode. Accordingly, in the case of supplying the multiplication pulse to the electrode V1, a level of the multiplication pulse may be set higher than that of the reading pulse.

In the case of the configuration in which the multiplication pulse is supplied to the electrode V3, the state of time t3 in FIG. 4 may proceed to the state of time t7 in FIG. 4 by supplying a driving pulse of 'M' to the electrode V2 and supplying the multiplication pulse to the electrode V3, then supplying a driving pulse of 'M' to the electrode V4 to move the electric charges in the charge accumulation packet to the packet formed below the electrode V3 for multiplication, and then supplying a driving pulse of 'L' to the electrodes V2, V3, and V4.

In the case of the configuration in which a multiplication pulse is supplied to the electrode V4, the state of time t3 in FIG. 4 may proceed to the state of time t7 in FIG. 4 by supplying a driving pulse of 'M' to the electrode V3, supplying the multiplication pulse to the electrode V4 to move the electric charges in the charge accumulation packet to the packet formed below the electrode V4 for multiplication, and then supplying a driving pulse of 'L' to the electrodes V3 and V4.

The reason why the multiplication pulse cannot be supplied to the electrodes V7 and V8 is as follows. That is, taking into consideration that a driving pulse of 'M' should be supplied to electrodes neighboring each electrode to which the multiplication pulse is supplied, in the case of supplying the multiplication pulse to the electrodes V7 and V8, the electric charges from the neighboring charge accumulation packet flow into the electrodes V7 and V8.

In addition, even in the second driving method, the driving section 4 may repeatedly perform the driving from time t4 to time t7 in FIG. 4 plural times in the same manner as in the first driving method. In this manner, the electric charges can be multiplied plural times. Accordingly, it is possible to increase the multiplication factor. The driving section 4 may adjust the multiplication factor by changing the number of times the electric charges are multiplied, that is, the number of times the driving from time t4 to time t7 in FIG. 4 is repeated, according to a photographing condition such as the photographing ISO sensitivity instructed from the system control section 9.

In addition, even in the second driving method, the driving section 4 may perform the driving from time t4 to time t7 shown in FIG. 4 whenever the charge accumulation packet is transferred a predetermined amount in the same manner as in the first driving method. For example, the driving section 4 performs the driving from time t4 to time t7 shown in FIG. 4 once or plural times whenever the charge accumulation packet is transferred to below the electrodes V5 and V6. In this manner, since the process for multiplying the electric charges accumulated in the predetermined charge accumulation packet can be performed in various positions on the vertical transfer channel, it becomes possible to reduce fixed-pattern noises resulting from a structure difference among the respective positions of the solid-state imaging device 1*b*.

Further, even in the second driving method, it is possible to apply a method in which the driving section 4 adjusts the saturated charge amount of the photoelectric conversion elements 21 at the time of high-sensitivity photographing, in the same manner as in the first driving method.

Furthermore, even in the second driving method, in the case where the saturated charge amount of the photoelectric conversion elements 21 is set to be small, the driving section 4 may set the number of times the driving from time t4 to time t7 shown in FIG. 4 are performed so that the multiplication factor of electric charges does not exceed Q2/Q1, in the same manner as in the first driving method.

In the case when the driving section 4 executes the first driving method or the second driving method to multiply the electric charges, the multiplication factors of the electric charges acquired from the photoelectric conversion elements 21 should be theoretically identical. However, the multiplication factors are different due to a manufacturing error of the solid-state imaging device 1*b*, for example. Therefore, in the digital camera according to the present embodiment, in the case where the driving section 4 performs the multiplication transfer driving, the digital signal processing section 6 is configured to perform a process for correcting variation, which occurs due to the different multiplication factors of the electric charges, of a signal corresponding to the electric charges acquired from each of the plurality of photoelectric conversion elements 21. For example, the digital signal processing section 6 has data on variation of the multiplication factors of the electric charges acquired from the respective photoelectric conversion elements 21 of the solid-state imaging device 1*b*, and corrects the variation of a signal acquired from each of the photoelectric conversion elements 21 on the basis of this data.

Moreover, the digital signal processing section 6 performs a known black level correction process for correcting black levels of photographing signals, which are acquired from the photoelectric conversion elements 21 except the photoelectric conversion elements 21 for black level detection, using a dark output signal corresponding to electric charges acquired from the photoelectric conversion elements 21 for black level detection included in the solid-state imaging device 1*b*. In addition, in the case where the multiplication transfer driving is performed in the driving section 4, the black level correction process is changed as follows. First, the digital signal processing section 6 corrects the variation, which is caused by the multiplication factor of electric charges of the dark output signal corresponding to the electric charges acquired from the photoelectric conversion elements 21 for black level detection. Then, the digital signal processing section 6 performs the black level correction for the signals, which are acquired from the photoelectric conversion elements 21 other than photoelectric conversion elements 21 for black level detection, using the dark output signal for which variation correction has been performed.

In the above description, a solid-state imaging device in which the photoelectric conversion elements 21 are arranged in the square lattice is used as the solid-state imaging device 1*b*. However, as long as a solid-state imaging device is a CCD type solid-state imaging device, the invention may also be applied to a solid-state imaging device other than the configuration shown in FIG. 2. A second embodiment in which a solid-state imaging device having a different configuration from that described above is used will now be described.

Second Embodiment

A digital camera, which will be described in the second embodiment, has basically the same configuration as that shown in FIG. 1 except that the configuration of the solid-state imaging device 1*b* in the imaging section 1 shown in FIG. 1 and a method in which the driving section 4 shown in FIG. 1 drives the solid-state imaging device 1*b* are different from those in the first embodiment. Accordingly, in the second embodiment, only the configuration of the solid-state imaging device 1*b* and a driving method performed by the driving section 4 will be described.

Figure 5:
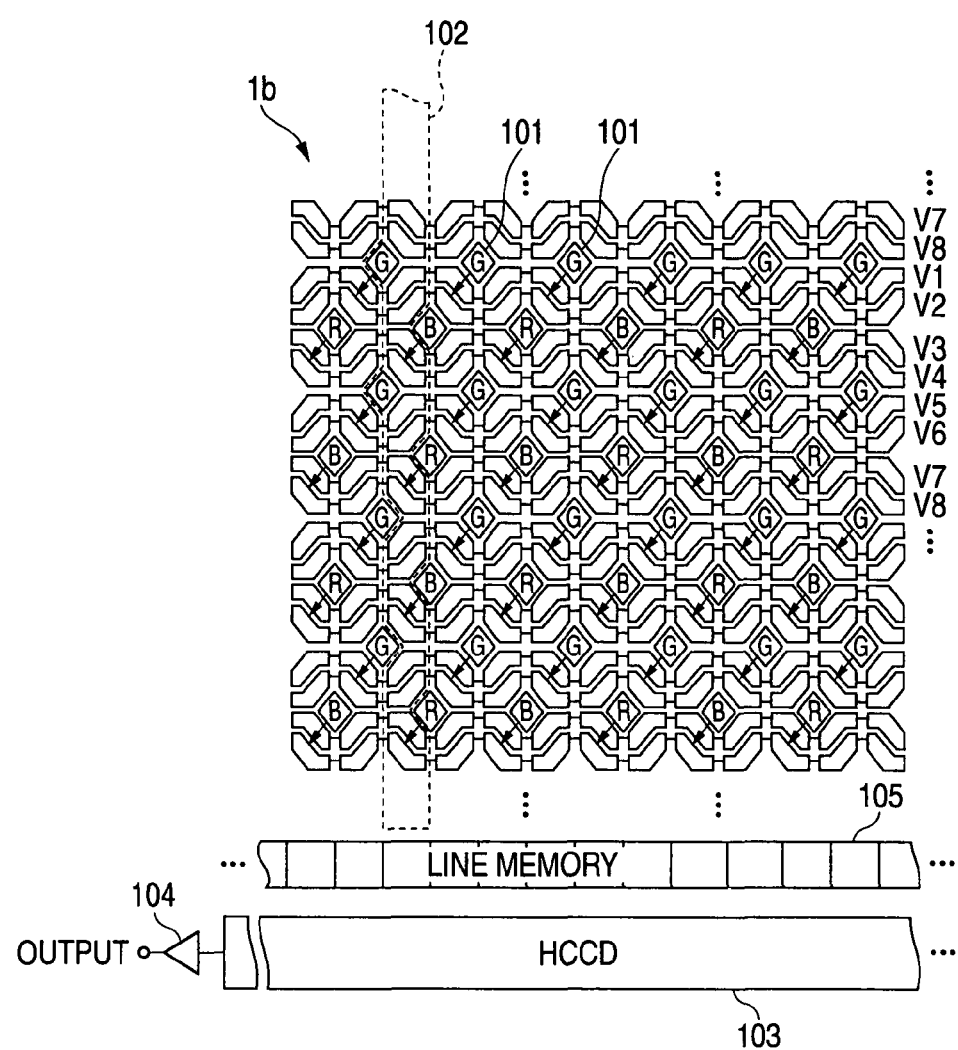
FIG. 5 is a plan view schematically illustrating the solid-state imaging device, which is shown in FIG. 1, and shows a second embodiment of the invention.

FIG. 5 is a plan view schematically illustrating the solid-state imaging device 1*b* shown in FIG. 1. In the solid-state imaging device 1*b*, a large number of photodiodes (photoelectric conversion elements) 101 are arranged on a semiconductor substrate in the form of a two-dimensional array so that the even-line photodiodes 101 shift by ½ pitch with respect to the odd-line photodiodes 101 (so-called, honeycomb array or checker array).

'R', 'G', and 'B' shown on the respective photodiodes 101 indicate colors (R: red, G: green, B: blue) of color filters laminated on the photodiodes 101, respectively. Each of the photodiodes 101 accumulates signal charges corresponding to an amount of received light having one of the three primary colors. In addition, even though an example of using a color filter based on a primary color system is described, a color filter based on a complementary color system may be employed.

On a surface of the semiconductor substrate, vertical transfer electrodes V1, V2, . . . , and V8 are provided to snake in the vertical direction so as to avoid the photodiodes 101. Four vertical transfer electrodes are provided corresponding to one photodiode 101. A vertical transfer electrode at the final stage is V8.

On the semiconductor substrate, an embedded channel (not shown) is formed to snake in the vertical direction at side parts of rows of the photodiodes, which are arranged in the vertical direction, so as to avoid the photodiodes 101. A vertical charge transfer devices (VCCD) 102 are formed of the embedded channel and the vertical transfer electrodes, which are provided on the embedded channel and which are arranged in a zigzag manner in the vertical direction. The vertical charge transfer devices 102 are driven by a driving pulses output from the driving section 4.

A horizontal charge transfer device (HCCD) 103 is provided in a lower part of the semiconductor substrate. The HCCD 103 is configured to include an embedded channel and horizontal transfer electrodes provided thereon. The HCCD 103 is driven by driving pulses output from the driving section 4. An output amplifier 104, which outputs a signal having a voltage value corresponding to the amount of electric charges transferred to the output end of the HCCD 103, is provided in the output end of the HCCD 103.

The solid-state imaging device 1b according to the second embodiment includes a line memory 105, which is aligned with the HCCD 103, in a boundary portion between the end of each VCCD 102 and the HCCD 103.

The line memory 105 is driven by a line memory driving pulse output from the driving section 4. In addition, the line memory 105 is used to add a pixel in the horizontal direction of signal charges by temporarily accumulating signal charges received from each VCCD 102 and controlling the timing at which the received signal charges are output to the HCCD 103, for example, as disclosed in JP 2002-112119 A.

Here, although terms of 'vertical' and 'horizontal' have been used in the above description, the terms of 'vertical' and 'horizontal' refer to 'one direction' and 'direction approximately perpendicular to the one direction' on the surface of the semiconductor substrate.

Figure 6:
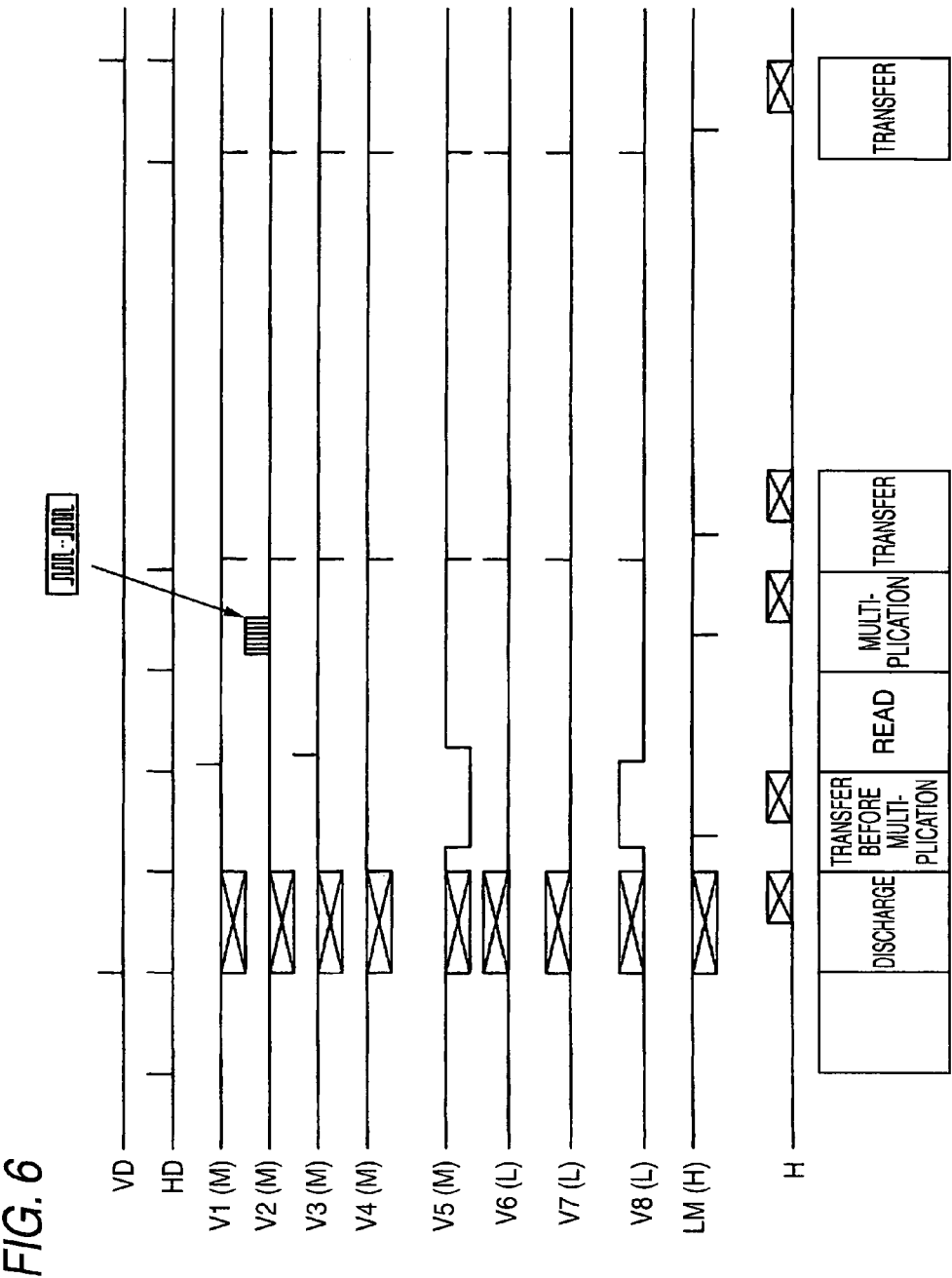
FIG. 6 illustrates a driving timing chart of the solid-state imaging device shown in FIG. 5.

FIG. 6 is a timing chart illustrating a driving pulse supplied to each electrode shown in FIG. 5 when performing the multiplication transfer driving by two field interlaced reading at the time of still image photographing. In FIG. 6, 'VD', 'HD', 'LM', and 'H' indicate 'vertical synchronization signal', 'horizontal synchronization signal', 'line memory driving pulse', and 'driving pulse for the HCCD 103', respectively.

After completion of an exposure period, the driving section 4 supplies the reading pulse of 'H' to the electrodes V1 and V3 to read out the electric charges to the charge accumulation packets formed below the electrodes V1 to V4. Then, the driving section 4 supplies a multiplication pulse of 'H' to the electrode V2 to move the electric charges in the charge accumulation packet to the packet below the electrode V2, to thereby multiply the electric charges. Then, the driving section 4 supplies a driving pulse of 'M' to the electrode V2. Thereafter, the driving section 4 supplies a predetermined transfer pulse to each of the electrodes V1 to V8 so that the charge accumulation packets are sequentially transferred. In addition, as shown in FIG. 6, the multiplication pulse may be supplied plural times.

Figure 7:
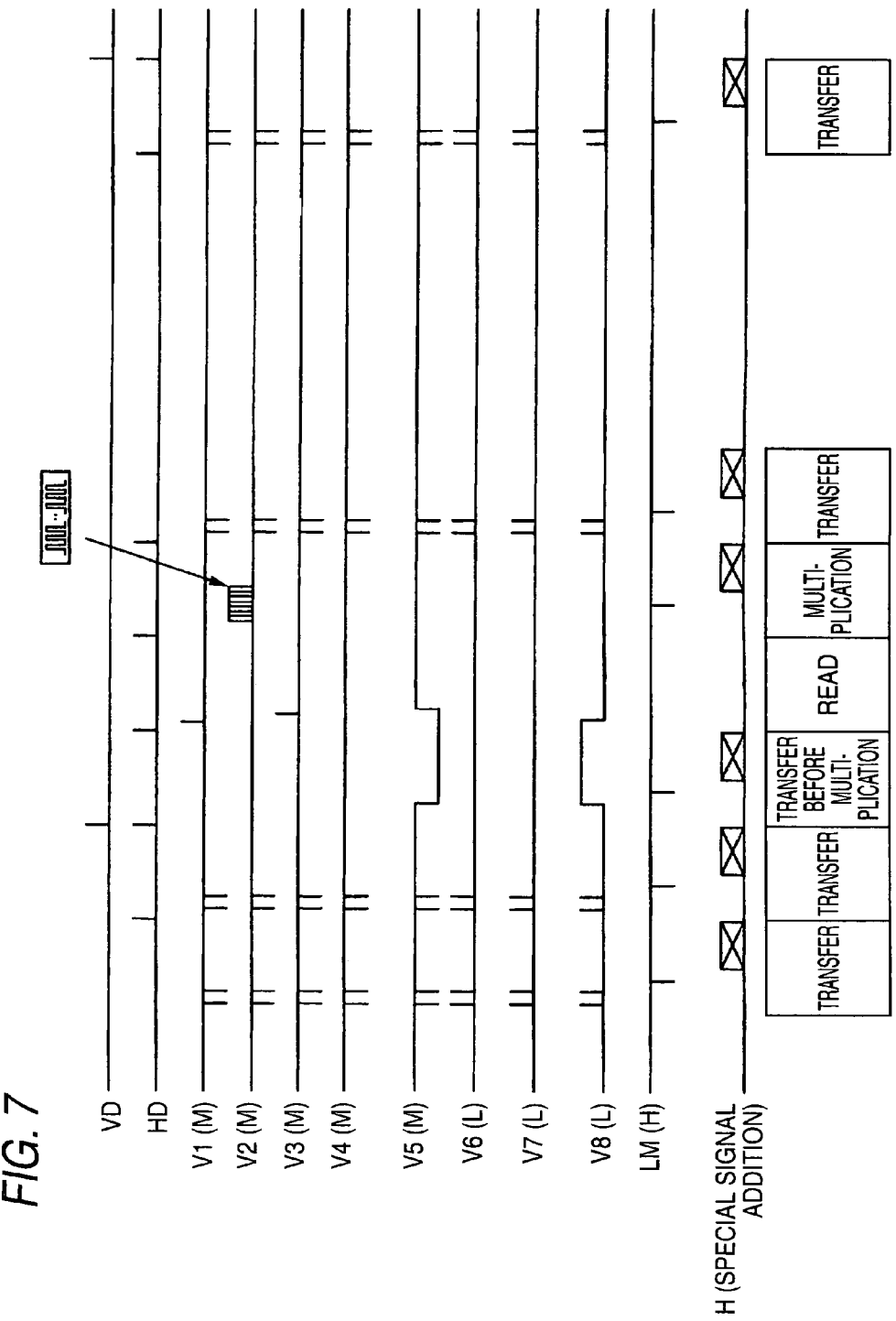
FIG. 7 illustrates a driving timing chart of the solid-state imaging device shown in FIG. 5.

FIG. 7 is an example of a timing chart illustrating a driving pulse supplied to each electrode shown in FIG. 5 when performing the multiplication transfer driving by the two field interlaced reading at the time of motion picture photographing. In FIG. 7, 'VD', 'HD', 'LM', and 'H' indicate 'vertical synchronization signal', 'horizontal synchronization signal', 'line memory driving pulse', and 'driving pulse of the HCCD 103', respectively.

After completion of the exposure period, the driving section 4 supplies a reading pulse of 'H' to the electrodes V1 and V3 to read the electric charges to the charge accumulation packet formed below the electrodes V1 to V4. Then, the driving section 4 supplies the multiplication pulse of 'H' to the electrode V2 to move the electric charges in the charge accumulation packet to the packet below the electrode V2, to thereby multiply the electric charges. Then, the driving section 4 supplies a driving pulse of 'M' to the electrode V2. Thereafter, the driving section 4 supplies a predetermined transfer pulse to each of the electrodes V1 to V8 so that the charge accumulation packets are sequentially transferred.

Figure 8:
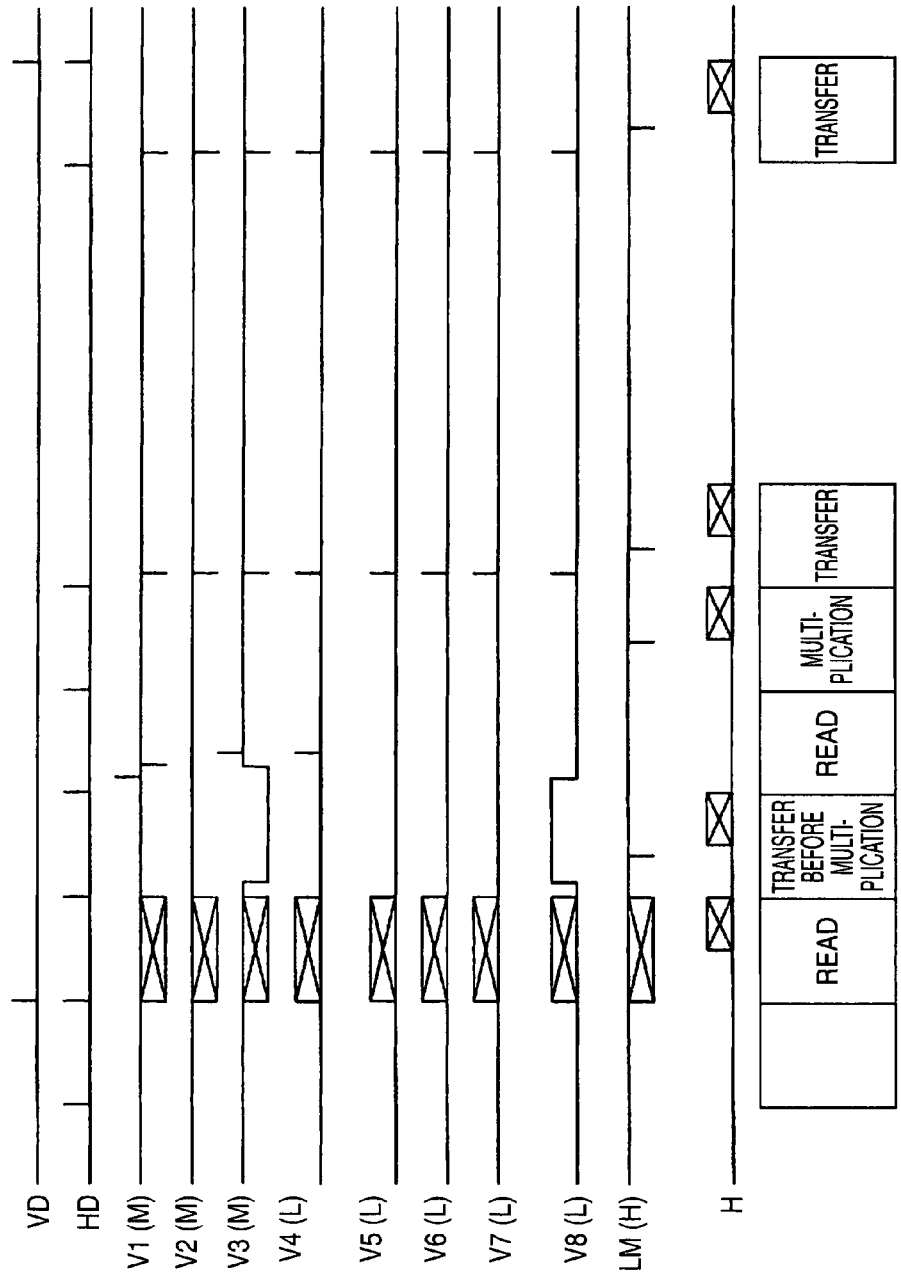
FIG. 8 illustrates a driving timing chart of the solid-state imaging device shown in FIG. 5.
Figure 9:
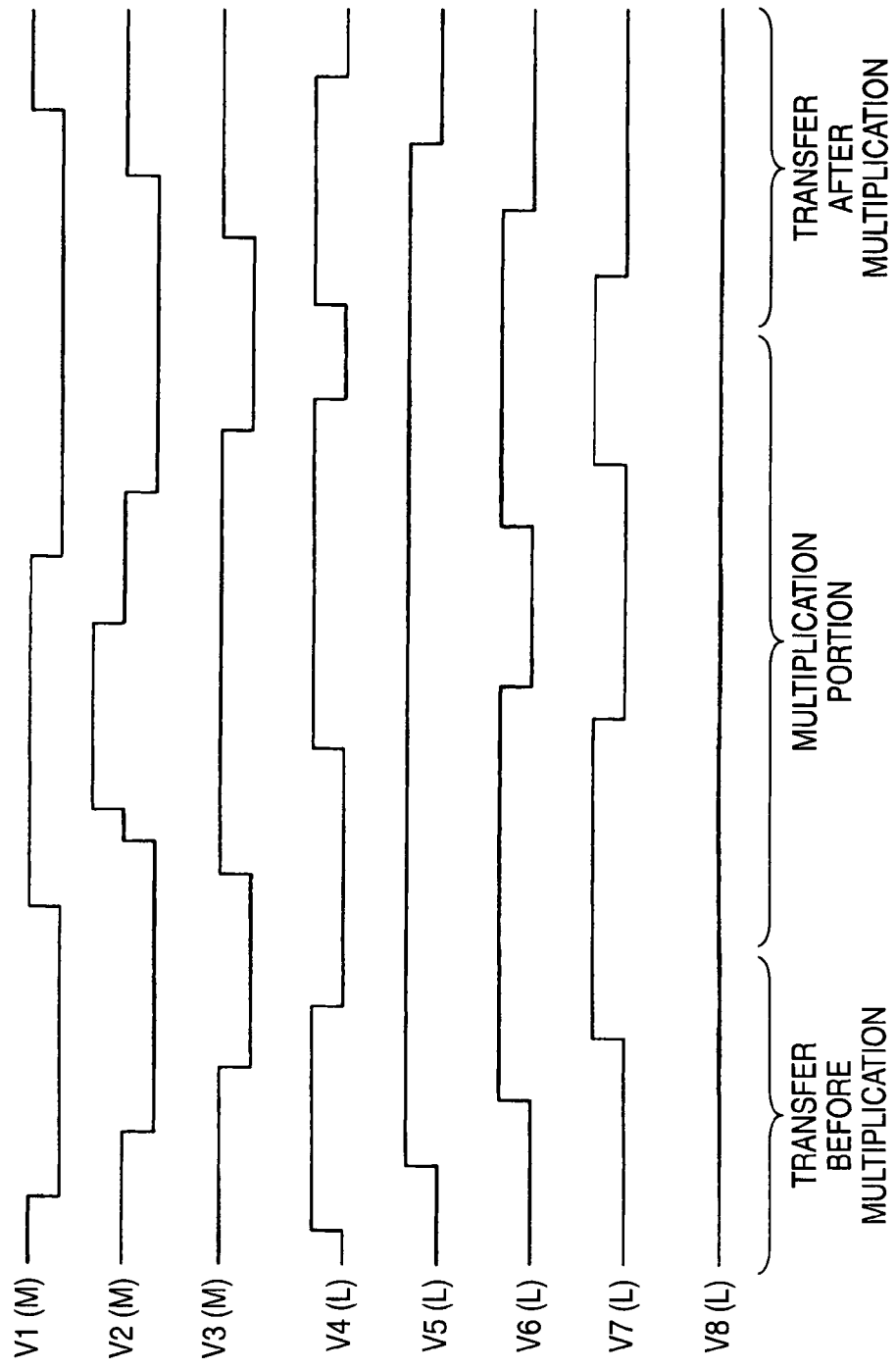
FIG. 9 illustrates a driving timing chart of the solid-state imaging device shown in FIG. 5.
Figure 10:
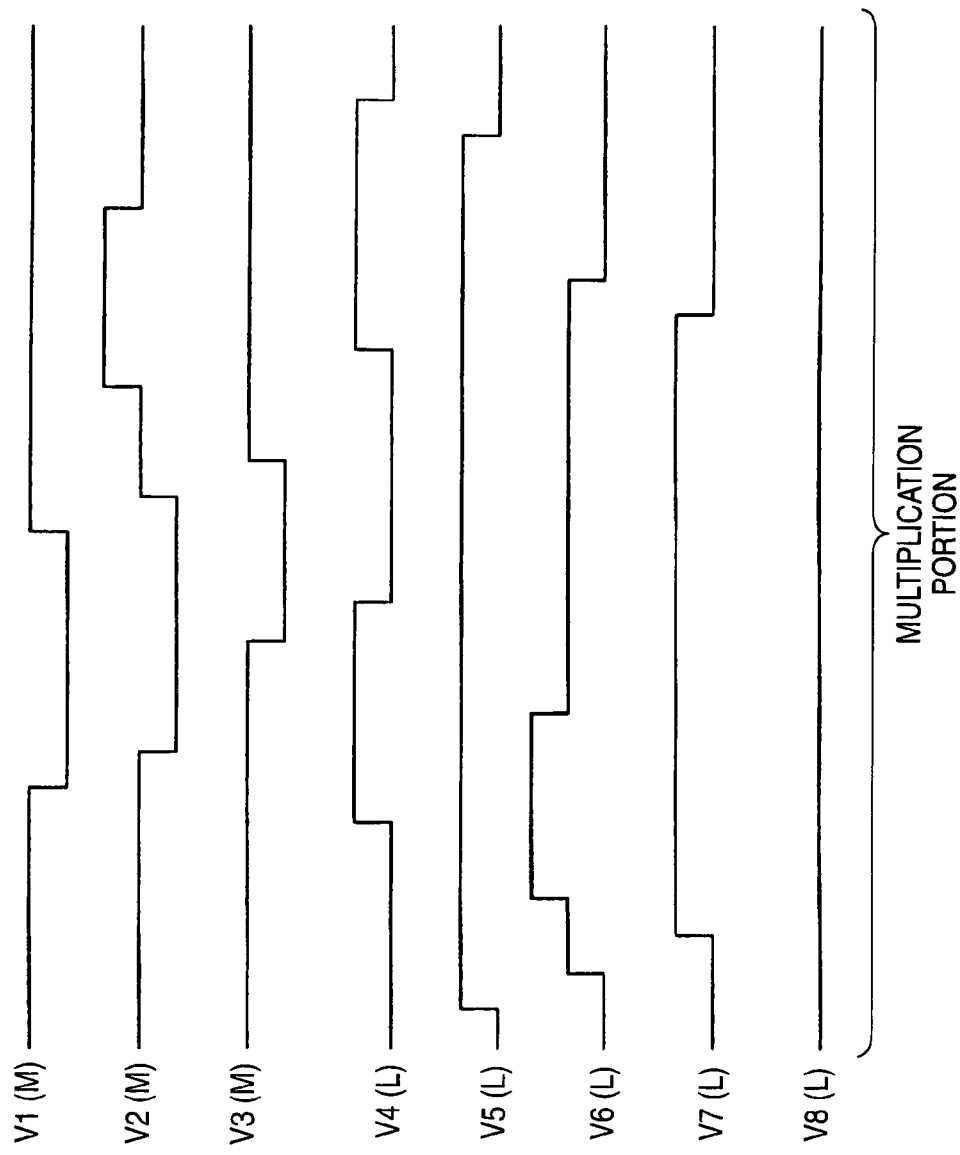
FIG. 10 illustrates a driving timing chart of the solid-state imaging device shown in FIG. 5.
Figures 11A, 11B, 11C:
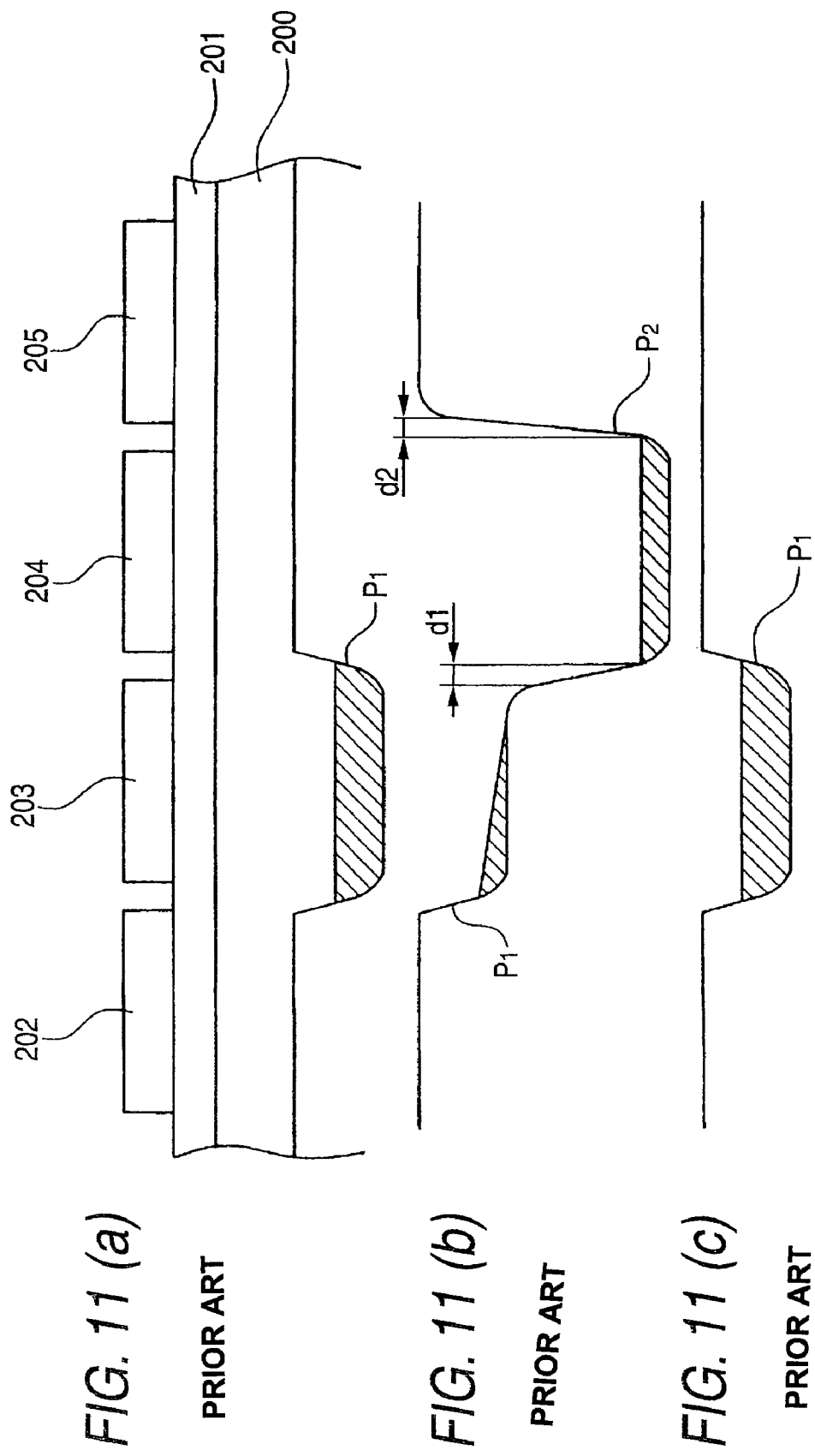
FIG. 11($a$), FIG. 11($b$) and FIG. 11($c$) is a view explaining a method for multiplying electric charges according to a related art.

FIG. 8 illustrates an example of a timing chart illustrating a driving pulse supplied to each electrode shown in FIG. 5 when performing the multiplication transfer driving by the two field interlaced reading at the time of still image photographing. In FIG. 8, 'VD', 'HD', 'LM', and 'H' indicate 'vertical synchronization signal', 'horizontal synchronization signal', 'line memory driving pulse', and 'driving pulse of the HCCD 103', respectively. FIG. 9 is a view illustrating a first example of a timing chart of a multiplication portion shown in FIG. 8. FIG. 10 is a view illustrating a second example of a timing chart of the multiplication portion shown in FIG. 8.

In the case of the solid-state imaging device 1b shown in FIG. 5, under the state where the driving shown in FIGS. 6 to 10 is performed, that is, a driving pulse of 'M' is supplied to two electrodes on both sides of an electrode to which a multiplication pulse is supplied and a multiplication pulse of 'H' is supplied to the electrode to which the multiplication pulse is to be supplied, the electric charges accumulated in the charge accumulation packet are moved to a packet formed below the electrode to which the multiplication pulse is supplied. Thus, driving for multiplying the electric charges in the charge accumulation packets is performed. Accordingly, it is possible to realize multiplication of electric charges with S/N less deteriorated.

What is claimed is:

1. A method of driving a CCD type solid-state imaging device comprising a plurality of photoelectric conversion elements arranged on a semiconductor substrate in a row direction and a column direction perpendicular to the row direction, and a charge transfer device that reads out electric charges generated in the plurality of photoelectric conversion elements, and that transfers the read electric charges in the column direction, which is a charge transfer direction, wherein the charge transfer device comprises a charge transfer channel formed in the semiconductor substrate, and a plurality of electrodes formed above the charge transfer channel, the method comprising:

reading out the electric charges from at least a part of the plurality of photoelectric conversion elements to the charge transfer channel;

multiplying the electric charges by moving the electric charges in a charge accumulation packet corresponding to middle one of three electrodes, which are arranged in the column direction and which respectively correspond to charge accumulation packets, to a multiplication packet formed below the middle one of the corresponding three electrodes by a multiplication pulse, wherein:

the multiplication packet corresponds to at least the three electrodes, and the multiplication packet is formed by supplying driving pulses having a predetermined level to both end ones of the three electrodes and supplying, to the middle ones of the three electrodes, the multiplication pulse that causes avalanche multiplication with respect to the predetermined level, wherein the multiplying is repeated plural times when the charge accumulation packets are located at predetermined positions;

switching between (i) multiplication transfer driving in which the multiplying is performed and (ii) normal transfer driving in which the multiplying is not performed, according to a photographing condition; and when the multiplication transfer driving is performed, making control so that a saturated charge amount of each of the plurality of photoelectric conversion elements at a time of imaging is smaller than a saturated charge amount of each of the plurality of photoelectric conversion elements at a time of imaging in a case of performing the normal transfer driving, wherein in the case of performing the multiplication transfer driving, the number of times the multiplying is performed is set so that a multiplication factor of the electric charges does not exceed Q2/Q1 where Q1 denotes the saturated charge amount of each of the plurality of photoelectric conversion elements at the time of imaging in the case of performing the multiplication transfer driving, and Q2 denotes the saturated charge amount of each of the plurality of photoelectric conversion elements at the time of imaging in the case of performing the normal transfer driving.

2. The method according to claim 1, wherein the multiplying comprises:
    supplying the driving pulses having the predetermined level to the three electrodes to form the charge accumulation packets corresponding to the three electrodes below the three electrodes, and
    supplying the multiplication pulse to the middle one of the three electrodes in a state where the charge accumulation packets have been formed, to form the multiplication packet.

3. The method according to claim 1, wherein the multiplying comprises
    setting any one of the electrodes, which are located above the charge transfer channel between the two charge accumulation packets adjacent to each other in the column direction, except side electrodes in one of the two charge accumulation packets as the middle electrode, and
    moving electric charges in the other charge accumulation packet to the multiplication packet formed below the middle electrode by the multiplication pulse to multiply the electric charges.

4. The method according to claim 1, wherein the multiplying is performed whenever the charge accumulation packets are transferred a predetermined amount.

5. The method according to claim 1, wherein number of times the multiplying is repeated is changed depending on a photographing condition.

6. The method according to claim 1, wherein a voltage of the multiplication pulse is equal to a voltage of a reading pulse used in the reading out of the electric charges generated in each of the plurality of photoelectric conversion elements to the charge transfer channel.

7. The method according to claim 1, wherein a voltage of the multiplication pulse is higher than a voltage of a reading pulse used in the reading out of the electric charges generated in each of the plurality of photoelectric conversion elements to the charge transfer channel.

8. A solid-state imaging apparatus comprising:
    a CCD type solid-state imaging device comprising:
        a plurality of photoelectric conversion elements arranged on a semiconductor substrate in a row direction and a column direction perpendicular to the row direction; and
        a charge transfer device that reads out electric charges generated in the plurality of photoelectric conversion elements, and that transfers the read electric charges in the colunm direction, which is a charge transfer direction; and
    a driving section that outputs to the CCD type solid-state imaging device a pulse for driving the CCD type solid-state imaging device by:
        reading out the electric charges from at least a part of the plurality of photoelectric conversion elements to the charge transfer channel;
        multiplying the electric charges by moving the electric charges in a charge accumulation packet corresponding to middle one of three electrodes, which are arranged in the column direction and which respectively correspond to charge accumulation packets, to a multiplication packet formed below the middle one of the corresponding three electrodes by a multiplication pulse, wherein:
            the multiplication packet corresponds to at least the three electrodes, and
            the multiplication packet is formed by supplying driving pulses having a predetermined level to both end ones of the three electrodes and supplying, to the middle ones of the three electrodes, the multiplication pulse that causes avalanche multiplication with respect to the predetermined level, wherein the multiplying is repeated plural times when the charge accumulation packets are located at predetermined positions;
        switching between (i) multiplication transfer driving in which the multiplying is performed and (ii) normal transfer driving in which the multiplying is not performed, according to a photographing condition; and
        when the multiplication transfer driving is performed, making control so that a saturated charge amount of each of the plurality of photoelectric conversion elements at a time of imaging is smaller than a saturated charge amount of each of the plurality of photoelectric conversion elements at a time of imaging in a case of performing the normal transfer driving, wherein
            in the case of performing the multiplication transfer driving, the number of times the multiplying is performed is set so that a multiplication factor of the electric charges does not exceed Q2/Q1 where Q1 denotes the saturated charge amount of each of the plurality of photoelectric conversion elements at the time of imaging in the case of performing the multiplication transfer driving, and Q2 denotes the saturated charge amount of each of the plurality of photoelectric conversion elements at the time of imaging in the case of performing the normal transfer driving.

9. The solid-state imaging apparatus according to claim 8, further comprising:
    a correction section that corrects variation, which is caused by a multiplication factor of the electric charges, of signals corresponding to the electric charges acquired from the plurality of photoelectric conversion elements when the multiplying is performed.

10. The solid-state imaging apparatus according to claim 8, wherein:
    the plurality of photoelectric conversion elements contain a plurality of black-level-detection photoelectric conversion elements for detecting a black level,
    the solid-state imaging apparatus further comprising:
    a black level variation correction section that corrects variation, which is caused by a multiplication factor of electric charges, of a dark output signal corresponding to the electric charges acquired from each of the plurality of black-level-detection photoelectric conversion elements when the multiplying is performed; and
    a black level correction section that corrects black levels of signals acquired from the plurality of photoelectric conversion elements except the black-level-detection photoelectric conversion elements, using the dark output signal corrected by the black level variation correction unit.

11. The solid-state imaging apparatus according to claim 8, wherein the multiplying comprises:

supplying the driving pulses having the predetermined level to the three electrodes to form the charge accumulation packets corresponding to the three electrodes below the three electrodes, and supplying the multiplication pulse to the middle one of the three electrodes in a state where the charge accumulation packets have been formed, to form the multiplication packet.

12. The solid-state imaging apparatus according to claim 8, wherein the multiplying comprises:

setting any one of the electrodes, which are located above the charge transfer channel between the two charge accumulation packets adjacent to each other in the column direction, except side electrodes in one of the two charge accumulation packets as the middle electrode, and moving electric charges in the other charge accumulation packet to the multiplication packet formed below the middle electrode by the multiplication pulse to multiply the electric charges.

13. The solid-state imaging apparatus according to claim 8, wherein the multiplying is performed whenever the charge accumulation packets are transferred a predetermined amount.

14. The solid-state imaging apparatus according to claim 8, wherein number of times the multiplying is repeated is changed depending on a photographing condition.

15. The solid-state imaging apparatus according to claim 8, wherein a voltage of the multiplication pulse is equal to a voltage of a reading pulse used in the reading out of the electric charges generated in each of the plurality of photoelectric conversion elements to the charge transfer channel.

16. The solid-state imaging apparatus according to claim 8, wherein a voltage of the multiplication pulse is higher than a voltage of a reading pulse used in the reading out of the electric charges generated in each of the plurality of photoelectric conversion elements to the charge transfer channel.

* * * * *